US009667932B2

(12) United States Patent
Posa et al.

(10) Patent No.: US 9,667,932 B2
(45) Date of Patent: May 30, 2017

(54) AUTOMATIC CORRECTION OF KEYSTONE DISTORTION AND OTHER UNWANTED ARTIFACTS IN PROJECTED IMAGES

(75) Inventors: John G. Posa, Ann Arbor, MI (US); Barry H. Schwab, West Bloomfield, MI (US)

(73) Assignee: Videa, LLC, West Bloomfield, MI (US)

( * ) Notice: Subject to any disclaimer, the term of this patent is extended or adjusted under 35 U.S.C. 154(b) by 406 days.

(21) Appl. No.: 13/095,569

(22) Filed: Apr. 27, 2011

(65) Prior Publication Data

US 2012/0200588 A1 Aug. 9, 2012

Related U.S. Application Data

(60) Provisional application No. 61/439,208, filed on Feb. 3, 2011.

(51) Int. Cl.
| | |
|---|---|
| *G09G 5/02* | (2006.01) |
| *H04N 9/31* | (2006.01) |
| *H04N 5/232* | (2006.01) |
| *H04N 5/14* | (2006.01) |
| *G09G 3/00* | (2006.01) |

(52) U.S. Cl.
CPC ......... *H04N 9/3194* (2013.01); *H04N 9/3185* (2013.01); *G09G 3/002* (2013.01); *G09G 2320/06* (2013.01); *H04N 5/144* (2013.01); *H04N 5/23258* (2013.01)

(58) Field of Classification Search
CPC .... H04N 9/3194; H04N 9/3185; H04N 5/144; H04N 5/23258; H04N 5/23264; G09G 2320/06; G09G 3/002
USPC .......................................................... 345/589
See application file for complete search history.

(56) References Cited

U.S. PATENT DOCUMENTS

| | | | | |
|---|---|---|---|---|
| 5,041,965 | A * | 8/1991 | Chen | 345/7 |
| 6,624,833 | B1 * | 9/2003 | Kumar et al. | 715/863 |
| 7,125,122 | B2 * | 10/2006 | Li et al. | 353/31 |
| 7,432,917 | B2 * | 10/2008 | Wilson et al. | 345/175 |
| 7,517,089 | B2 * | 4/2009 | Matsuda | 353/69 |
| 7,775,883 | B2 * | 8/2010 | Smoot et al. | 463/36 |
| 8,272,748 | B2 * | 9/2012 | Furui | 353/70 |

(Continued)

OTHER PUBLICATIONS

"Automatic Keystone Correction for Smart Projectors with Embedded Camera" pp. 2829-2832—Baoxin Li and Abraham Sezan (2004 International Conference on Image Processing).*

(Continued)

*Primary Examiner* — Robert Craddock
(74) *Attorney, Agent, or Firm* — John G. Posa; Belzer PC

(57) ABSTRACT

A system for manual or automatic correction of geometric or video image distortions introduced by projection onto obliquely angled or imperfect surfaces. Sensors may be disposed at the projector itself, at the projected image surface, or in a portable remote-control unit. Corrections may be applied as part of an original set-up process, or dynamically as the configuration changes. Image-stabilization techniques are utilized where applicable, as is the use of test patterns and the incorporation of "helper" signals into the video image. Tactile-sensing capabilities provide an interactive environment, and various packaging configurations for projection units and sensor provisions are disclosed.

23 Claims, 5 Drawing Sheets

(56) References Cited

U.S. PATENT DOCUMENTS

| | | |
|---|---|---|
| 2005/0168705 A1 | 8/2005 | Li et al. |
| 2006/0279477 A1* | 12/2006 | Allen et al. ................... 345/30 |
| 2009/0046146 A1 | 2/2009 | Hoyt |
| 2010/0257478 A1* | 10/2010 | Longe et al. ................ 715/773 |
| 2011/0234524 A1* | 9/2011 | Longe et al. ................ 345/173 |
| 2011/0298709 A1* | 12/2011 | Vaganov ...................... 345/158 |
| 2012/0218200 A1 | 8/2012 | Glazer et al. |

OTHER PUBLICATIONS

Layton, J., How Remote Controls Work, *How Stuff Works on the Web*, pp. 1-5, Nov. 12, 2005.

\* cited by examiner

AUTOMATIC CORRECTION OF KEYSTONE DISTORTION AND OTHER UNWANTED ARTIFACTS IN PROJECTED IMAGES

REFERENCE TO RELATED APPLICATION

This application claims priority from U.S. Provisional Patent Application Ser. No. 61/439,208, filed Feb. 3, 2011, the entire content of which is incorporated herein by reference.

FIELD OF THE INVENTION

This invention relates to image and video projection systems, and, more particularly, to a system for correcting geometric and distortions introduced by projection onto imperfect surfaces.

BACKGROUND OF THE INVENTION

With the advent of super bright and ultra-bright light-emitting diodes and portable electronic devices that are too compact to provide displays which show a great deal of information, projected video and still images will become more popular. At the same time, since it might not be known upon which surface the light will be projected, certain undesirable image artifacts and distortions, such as keystone effects, will need to be addressed. Although there are many proposed solutions, including patents which are directed to keystone correction, they all make assumptions about the relationship between the projector and the projected image; if these assumptions are incorrect, a geometrically unacceptable projection may still result. This invention corrects for keystone effects and other unwanted image artifacts and deficiencies such as brightness, contrast, color uniformity, etc., in a projected image, regardless of the surface chosen for projection.

SUMMARY OF THE INVENTION

The instant invention comprises a video image projection system capable of sensing and correcting for image distortions, such as keystone effects and image artifacts and deficiencies, which are introduced by imperfect projection configurations. In particular, provisions are included for off-angle projection, or image projection onto imperfect surfaces.

Projected image correction apparatus constructed in accordance with the invention includes a device with a display generator and a projector projecting an image onto a surface. A sensor views the projected image and communicate information to the device enabling the display generator to correct for keystone effects or incorrect aspect ratio; variations in brightness, contrast, color rendition, saturation, hue, focus, sharpness, or movement of the projector. The device may be a video projector, camcorder, portable computer, smart phone.

The sensor, which may be a two-dimensional image sensor, may be disposed in the projector device, or in a hand-held remote control unit which communicates the information to the device through a wireless connection. The correction may occur in conjunction with an initial projection, in response to a user input, or on a continuous basis.

The projection device may include a detachable display screen providing the surface, for example a detachable rigid or semi-rigid panel or a roll-out screen. The screen may include corner or edge indicia to assist the sensor in determining the periphery of the screen. Hardware or software may be included to generate a test pattern for correction purposes.

With the image geometry sensor disposed on or in the projection device, the unit senses geometric and video distortions, and provides corrective information to projection circuitry, enabling the unit to manipulate the shape of the projected image so as to produce a "squared" image with corrections to video parameters such as brightness, color rendition, and so forth. The corrections may be either manually applied, or automatically applied by the projection circuitry.

Alternatively the sensor may be disposed on or in a portable remote control unit in wireless communication with the projection unit. This simplifies the adjustments to be applied to the projected image where there is a desire to apply these corrections from the point of view of the audience, or when the projector itself may not be in a fixed location. If a detachable projection screen is utilized it may include sensing provisions located either on the projection unit, or alternatively on the projection screen itself.

One preferred implementation of the invention includes a display buffer storing a raw or 'desired' image to be seen by a viewer. A projection buffer is used to store a version of the raw image to be projected onto the surface, and a sensor buffer is used to store an image of the projected image as viewed by the sensor. The display processor is operative to compare the image stored in the sensor buffer to the image stored in the display buffer and adjust the image stored in the projection buffer so that the projected image seen by the sensor corresponds to the image stored in the display buffer. The display processor may be operative to perform one or more of the following adjustments to the image stored in the projection buffer: flipping, stretching, luminance or color curve adjustment, color replacement, pixel interpolation, or rotation.

Further aspects of the invention enables the projected image to function as a "touch screen," enabling a user to "select" points on the displayed image, enlarge and reduce dimensions, scroll, turn pages, and so forth. This feedback feature can be used to "stretch" the corners of the image (much like the "rubber-band" feature in graphic and drawing software enables the manipulation of the shape of an object), thereby enabling the user to "click-and-drag" the corners of the projected image to manually correct for keystone effects, or to assist in the auto-correction process for geometric correction. These embodiments include gesture recognition apparatus operative to recognize a gesture made by a finger, hand or other body part overlying the projected image in the view of the sensor, and control the device or projected image in response to the recognized gesture.

Assuming the projected image has x and y coordinates associated therewith, the gesture recognition apparatus is operative to determine the coordinates of a finger, hand or other body part overlying the projected image in the view of the sensor. The system is then operative to compare the position or movement thereof a finger, hand or other body part overlying the projected image to corresponding coordinates associated with the projected image to control the device or the projected image. The sensor may include an infrared imaging capability to assist in detecting a finger, hand or other body part overlying the projected image.

A tactile sensor may be provided to generate a wireless signal if a point of the surface is touched by a user. A wireless receiver receives the wireless signal, with the system being operative to receive the image viewed by the sensor, determine the coordinates of the point touched by the user in response to receipt of the wireless signal, and compare the coordinates to the coordinates of the projected image to select a region of the projected image associated with the point. The wireless signal may be an optical signal such as an infrared signal, with the sensor is operative to detect the optical signal, or an RF or acoustical signal.

The various embodiments of the invention provide for numerous features, including automatic or manual correction of geometric distortions, video parameters, and screen texture and color. Provisions also are included for automatic "horizontal level-sensing," image-stabilization, and a tactile-sensing interactive environment, as well as the use of internally-generated test patterns and an artificial image-frame to assist in manual and automatic correction of image deficiencies. The disclosure anticipates a variety of packaging configurations, from small, portable projection devices (such as cellular phones or PDAs), to large scale stand-alone video projectors.

DETAILED DESCRIPTION OF THE INVENTION

Figure 1A:
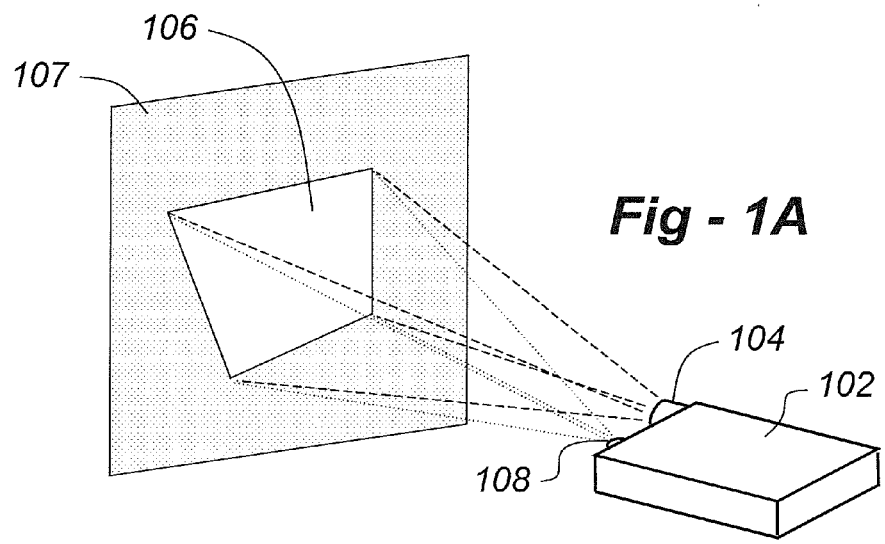
FIG. 1A depicts a first embodiment of the invention, in which the sensor device is disposed at the projector unit.

FIG. 1A illustrates one embodiment of the invention including an image projector 104 and sensor 108 integrated into a single unit 102. For the purposes of this invention, "image projector" should be taken to mean still or moving pictures (i.e., video), regardless of aspect ratio or resolution. The invention is not limited in terms of projector technology, which includes light-transmissive (i.e., LCD) and light-reflective (i.e., DLP) approaches. "Sensor" should be taken to mean any type of suitable image-gathering device, preferably a two-dimensional image sensor based upon charge-coupled devices (CCDs), for example. Although a relatively high resolution color sensor is preferred, that is not necessary to the basic implementation of the invention. To correct artifacts such as keystone effects alone, for example, a relatively low-resolution image sensor may be used, even a monochrome sensor. Also the "unit" 102 should be taken to include a dedicated or stand-alone projector adapted for connection to a source of imagery to be projected, or any device that would benefit from a projected display, including laptop and tablet computers, smart phones, camcorders, and so forth.

Continuing the reference to FIG. 1A, projector 104 produces an image 106 on a surface to be viewed by an audience. The image 106 may include various undesirable artifacts, including keystone effects or other aspect-ratio issues; brightness, contrast, color, focus or sharpness variations, and so forth. To alleviate such problems, this invention utilizes an image sensor which observes the projected image to obtain a true, real-time picture including any undesirable artifacts that may be present. Information about the projected image is then communicated to a graphics processing unit (GPU) or other electronic circuitry within the projection unit to correct for the artifacts detected, as discussed in further detail below. In all embodiments, the correction may occur at a given time during start-up or by pressing a "correct" button, for example, or adjustments may automatically occur at present intervals or in real time to account for changes in position or lighting over time.

Figure 1B:
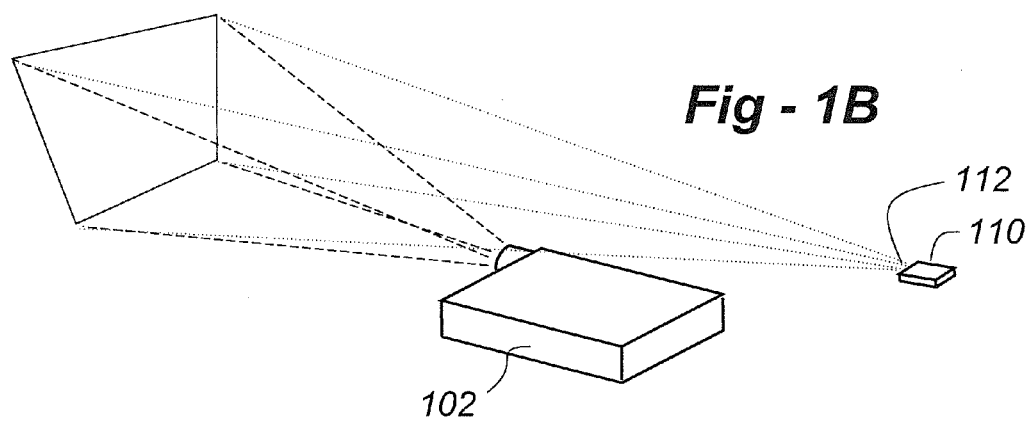
FIG. 1B depicts an alternative embodiment of the invention, in which the sensor device is disposed on portable remote-control unit in communication with the projector unit.

In FIG. 1A, the projector and sensor are integrated, such that the projected image is corrected from the perspective of the projector itself. There may be situations, however, where it is desirable to correct the image from a perspective other than that of the projector, such as that seen by a particular viewer. FIG. 1B illustrates an alternative embodiment of the invention wherein the image sensor/camera is housed in a hand-held remote control unit 110 which communicates wirelessly to projection device 102. The remote 110 may simply be an image correction device, including a still or video camera 112; however, in the preferred configuration, the remote device 110 forms the same remote control device used to change images and control the projector 102. With this embodiment the remote unit may be operated at a desired location associated with an audience or selected viewer, thereby correcting for artifacts relative to a particular viewing location. In addition, this embodiment allows for corrections to be implemented when the projector 102 may not maintain a fixed position.

Thus, in each of the embodiments disclosed herein, corrections can be applied to provide the desired image as viewed from various points of view: rectilinear or "squared" image as seen by the projection source; "squared" image as seen by the audience; or "squared" image as seen by a dynamically changing point of view. The applicability of the invention is not limited by the size of the projected image, the texture or nature of the surface onto which the image is to be projected, or the particular position of the projection unit relative to the surface onto which the image is to be projected, and any variations in these variables should be considered to be within the scope of the invention.

Figure 2:
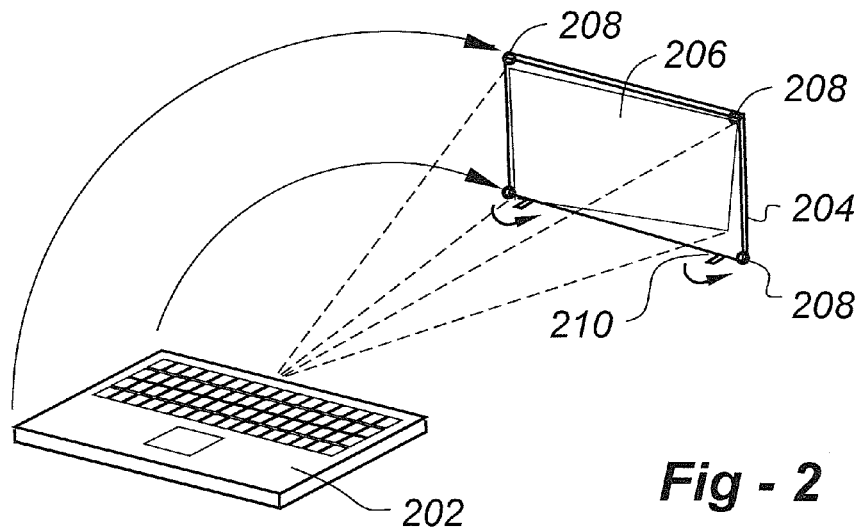
FIG. 2 depicts an alternative embodiment of the invention, in which the sensor device is disposed on the projector unit, and a detachable screen is used for the image projection surface.

FIG. 2 illustrates of the applicability of the invention to a portable electronic device 202 having a detachable screen 204 and a built-in projector projecting an image 206 onto the screen 204. The image sensor can be built into the device 202, or in a remote unit as discussed with respect to FIGS. 1A and 1B. Feet 210 may be used to stabilize the screen 204 at a desired distance from the projecting device 202. The projecting device 202 may be any kind of portable electronic device, including a laptop or tablet computer; MP3/video player, a device utilizing a display for video content or controls, or the like. The screen 204 may have corner dots 208 or other indicia, such that regardless of where it is placed relative to the projecting unit 202, the sensor may better discern the outer periphery of the screen 204 and project the image to completely fill that screen, if desired.

Alternatively, the sensors 208 may be connected to the projector unit through a communication link, thereby providing direct feedback from the surface as adjustments are made.

As opposed to a rigid screen which detaches from the portable electronic device as shown in the upper portion of FIG. 2, a flexible unrolling-type screen may be used, much like the portable screens used with slide projectors and movie cameras of the past. This would allow the screen to be installed and removed from the portable electronic device as a small cylindrical tube. Alternatively, of course, the projection device 202 may project onto a wall or other surface.

Figure 3:
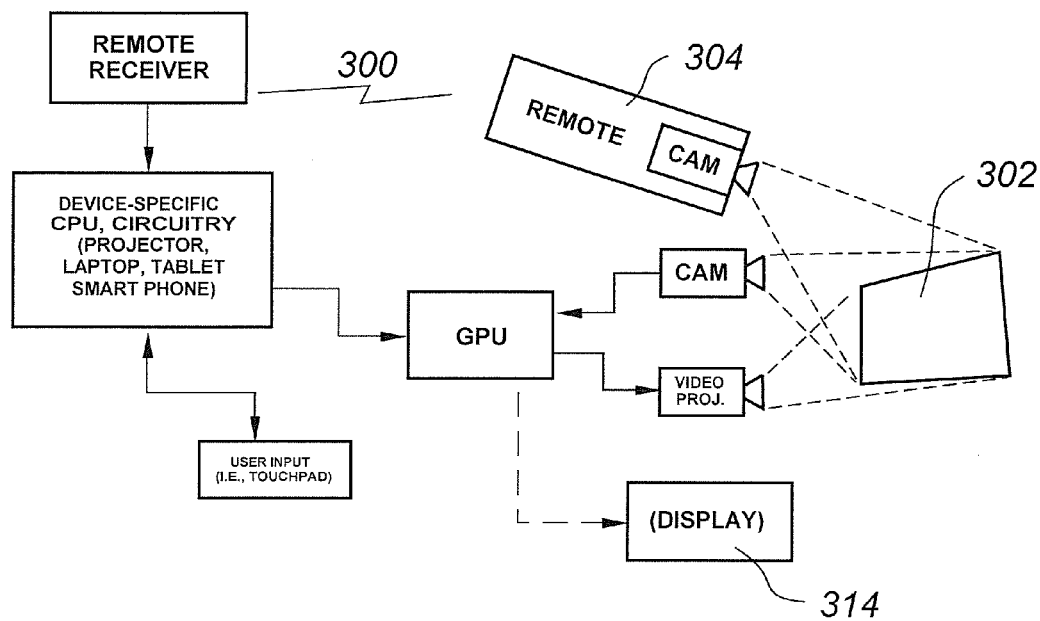
FIG. 3 depicts a functional block diagram displaying many of the features of the preferred embodiment of the invention.

FIG. 3 illustrates a simplified block diagram of the preferred embodiments. In essence, a 'feedback loop' 300 is established in accordance with the invention, whereby the projected image 302 is detected and analyzed by the sensor/camera 304 and corrected, either automatically and/or in accordance with user viewing preferences. A display 314 is shown because the invention does not preclude the use of a display panel other than or in addition to the projected image. A computer or smart phone, for example, would typically have both a display screen and a projector. To enhance operation, projecting device may be equipped with the capability of producing an image at 106 which is specifically intended for image correction; that is, it may have a test pattern, with edges, color or brightness better "seen" by the sensor. These kinds of test materials are known to those skilled in the art of video camera set-up.

There may be some difficulties involved in the detection of the corners of the projected images by the sensor. For example, when the sensor is co-located within the projector, if a perpendicular to the surface that is to receive the image is at an oblique angle relative to the projection axis, then the amount of light reflected back towards the sensors will be reduced significantly. Due to such circumstances, it is advantageous for the sensor to have sufficient sensitivity to detect low levels of reflected light. In addition, the amount of light reflected will be affected by many other factors depending on the smoothness of the surface, the color of the surface, the brightness of the projected image, etc. In such cases, the use of "fuzzy logic" as applied in commercially available consumer video cameras may be utilized to provide guidance to the correction process, as described herein below.

There are several options which may be implemented to improve the utility and performance of the system. For example, provisions may be included to automatically identify "level" or true horizontal, to assist in the "squaring" process. Additionally, appending a "frame" line surrounding the projected image pixels can assist in detecting when the projected image is "square," and also assist in the "leveling" process. For example, in the embodiment depicted in FIG. 2, the corner detection can be utilized to locate the "edge" of the image, either from the "frame" markings, or from detection of the apparent image edge based on content (or lack thereof), and the information then can be used to automatically adjust the geometry of the projected image.

In addition, internally generated "test patterns", such as the traditional "convergence pattern" "color bars," etc. and other test signals utilized in broadcast and other professional applications, can assist the alignment of the system, in much the same way that these signals are utilized to align and calibrate the geometric, luminance, and chrominance characteristics of professional cameras and video monitors. Many of the same techniques applied in systems utilized for automatic alignment and matching of cameras and monitors could advantageously be applied for aligning the projected image system of the instant invention.

With the use of a standardized test signal, such as the "convergence pattern" signal, it would be possible to detect the texture and/or imperfections of the surface on which the image is to be projected. Knowing this information, corrections can be applied at whatever level of detail is desired by the user, and even complicated distortions, such as would be encountered in projecting onto a brick wall or hanging drapes, could be applied to optimize the visible image. Similarly, corrections to luminance and/or chrominance imperfections can be applied, to optimize the visible image at whatever level of detail is desired by the user. In the case of uneven surfaces, particularly those with repeating patterns such as brick walls, etc., a white or uniform-color display may be projected, enabling the sensor to gather an image of the surface texture which may then be used by the graphics processor to "subtract off" irregularities in luminance, color, focus, sharpness, and so forth.

Figure 4A:
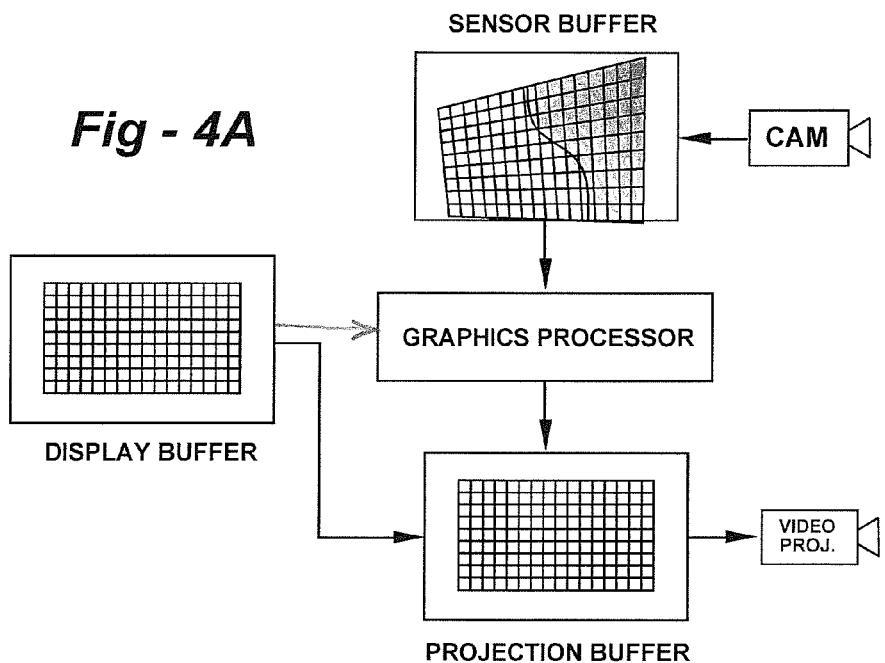
FIGS. 4A and 4B are simplified drawings which illustrate the way in which the correction process operates.
Figure 4B:
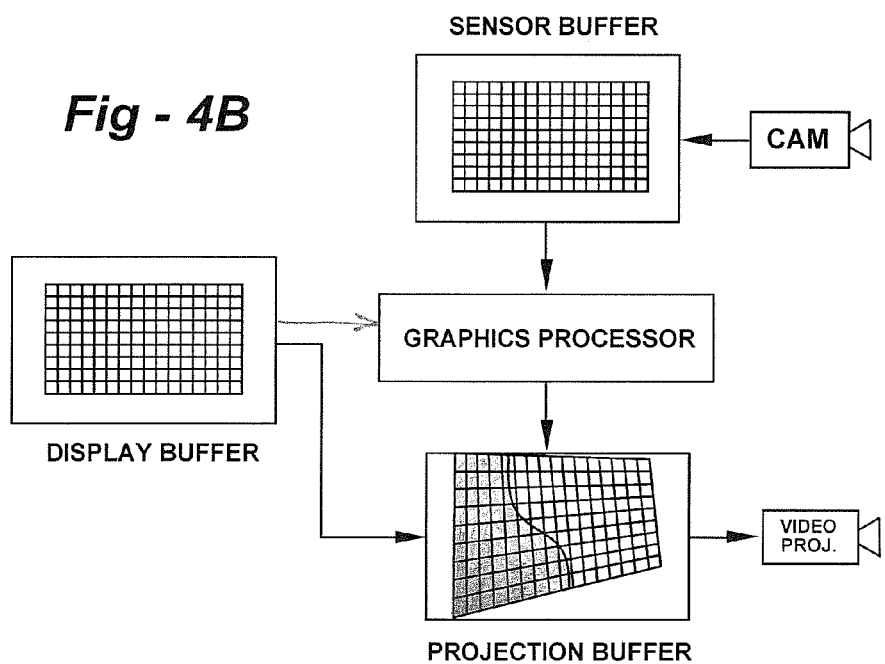

FIGS. 4A and 4B are simplified drawings which better illustrate the way in which the correction process operates. In the preferred embodiments different buffer memories are used for different purposes, namely for "raw" and "corrected" and images. In reference to FIG. 4A, the image in the display buffer represents a raw image to be displayed without any undesirable artifacts generated through color or luminance variations or projection onto uneven or imperfect surfaces. If the raw image is simply transferred to the projection buffer used to project the image, the actual image seen by the sensor as shown in the sensor buffer suffers from horizontal and vertical keystone distortion and side-to-side washout (depicted with gray tone variation) due to uncontrollable lighting effects and/or projected surface unevenness.

To correct for these distortions, a graphics processor analyzes the image in the sensor buffer and compares is to the desired raw image in the display buffer. The graphics processor modifies the image in the projection buffer so that the image in the sensor buffer matches the raw image in the display buffer, at least as practical under the circumstances. Typically the projection buffer will generate an intentionally distorted and/or mirror image of the raw image, such that when the intentionally distorted or mirror image is projected, the image in the sensor buffer more closely resembles the desired image in the display buffer. The graphics processor may use various techniques to create the intentionally distorted and/or mirror image of the raw image, including flipping, stretching, luminance or color curve adjustment, color replacement, pixel interpolation, rotation and so forth.

To correct for movement of the projector the invention may incorporate image-stabilization technology. In many consumer cameras and camcorders, provisions are included for automatic image-stabilization, to mitigate the artifacts introduced by the user while simply trying to hold the camera steady. Mechanical provisions, such as gyroscopes, may be included, or the correction may be based on electronic methods. In the case of the electronic approach to this problem, movement is detected by comparison of consecutive frames (or fields), to determine which objects are moving, and which movements actually are related to unsteadiness by the holder. Movement of the entire frame of the image is attributed to unsteadiness, while movement of individual objects relative to other objects is attributed to true motion by these objects. Movement of the entire image frame can be canceled out by correcting for the detected motion, leading to a more stable image. Importantly, this also provides an opportunity to apply noise reduction, to improve the quality of the image as projected.

Figure 5A:
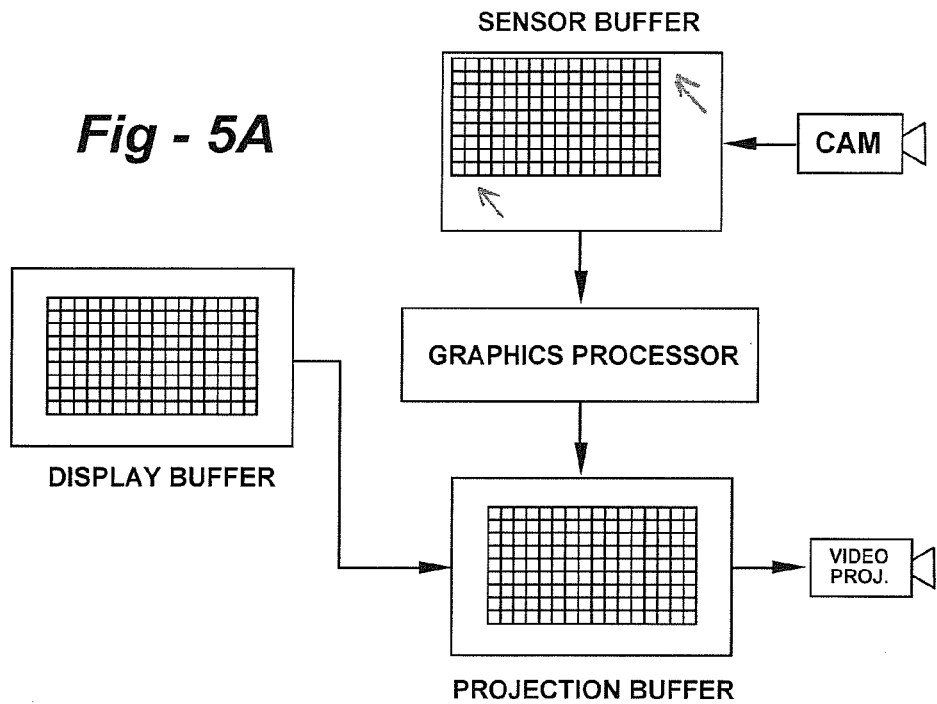
FIGS. 5A and 5B are simplified drawings which illustrate the way in which the invention provide image stabilization.
Figure 5B:
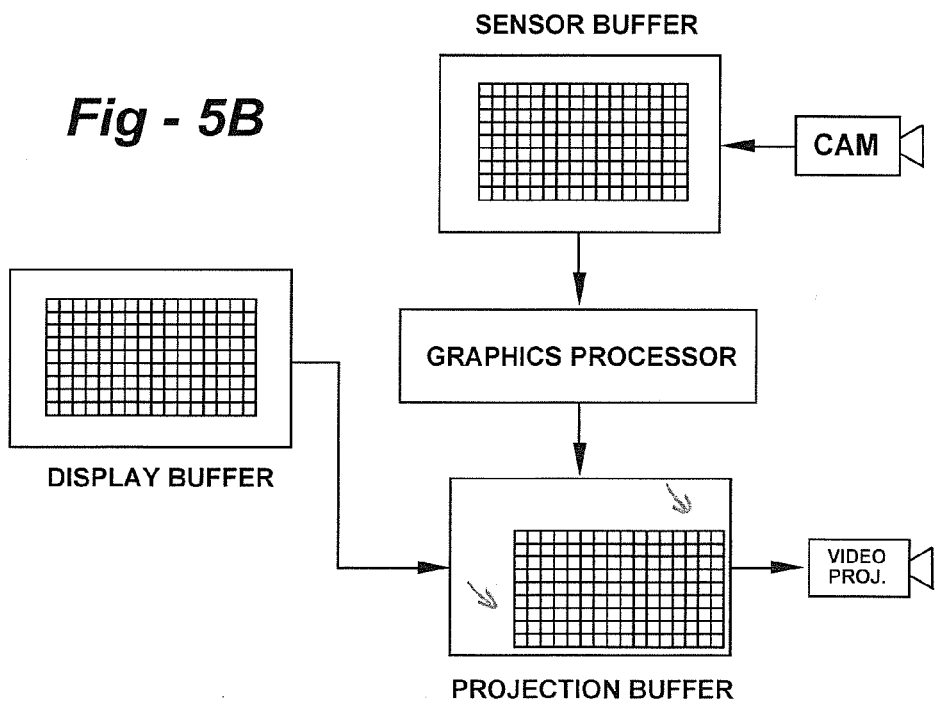

FIGS. 5A and 5B illustrate this aspect of the invention. In FIG. 5A, the entire image in the sensor buffer is shifted towards the upper left, indicating that the projector has moved. This may occur with any hand-held device such as a smart prone projector being used in a moving car, as one example of many. The graphics processor detects this movement through comparison of the image in the display buffer to the shifted image in the sensor buffer. To stabilize the image, the image in the projection buffer is intentionally shifted to compensate for the movement such that the images in the sensor and display buffers now correspond. In the event the graphics processor is unable to compensate for the motion if its is extreme or otherwise unexpected, the projection buffer may be selectively turned off or the frame rate reduced to facilitate movement compensation.

A further aspect of the invention enables the projected image to function as a "touch screen," enabling a user to "select" points on the displayed image, enlarge and reduce dimensions, scroll, turn pages, and so forth, much like operations now possible with the iPhone and pointing devices such as a mouse or touchpad. This feedback feature can be used to "stretch" the corners of the image (much like the "rubber-band" feature in graphic and drawing software enables the manipulation of the shape of an object), thereby enabling the user to "click-and-drag" the corners of the projected image to manually correct for keystone effects, or to assist in the auto-correction process for geometric correction.

Figure 6:
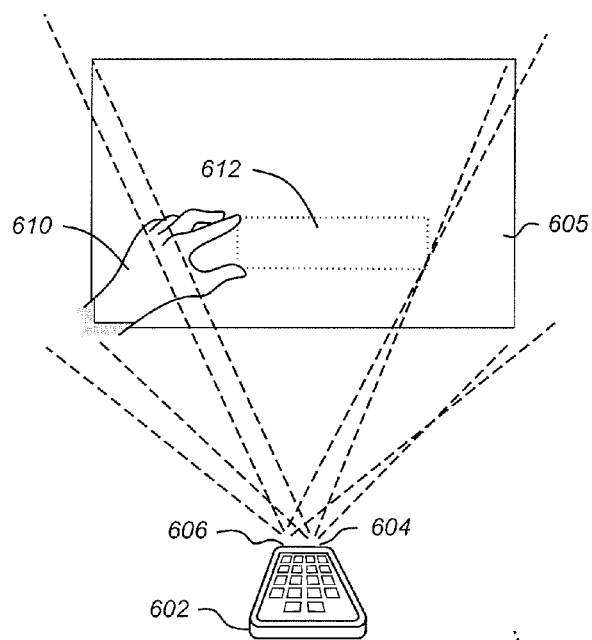
FIG. 6 shows a device such as a smart phone having a projector producing an image on a surface and a sensor viewing the projected image along with gesture recognition which determines the position and/or movement of a finger, hand, or other body part for control purposes.

Since the invention incorporates a sensor operative to look at the projected image, the sensor may be used to detect a finger, hand or other body part in the projection and interpret position or movements made as selections of control inputs. FIG. 6 shows a device 602 such as a smart phone having a projector 604 producing an image 605 on a surface and a sensor 606 viewing the projected image. The hand 610 of a user intersects the projected image, and the user is using their fingers to enlarge a region 612 of the projected image. This is possible because the x-y pixel coordinates of the projected image are known by the graphics processor. Even if the graphics processor has manipulated or corrected the projected image, the x-y coordinates are known through comparison(s) with the raw image in the display buffer.

Continuing the reference to FIG. 6, the coordinates of the hand 610 (or other body part) may also be determined in several ways. Since the projected image should "look like" the raw image in the display buffer, gross differences in area seen by the sensor may be presumed to be an object in the path of the projected light, particularly if the object (i.e., hand or finger) is moving. In addition, if the sensor is able to detect in the infrared (which is often the case), the sensor (or separate sensor) can be used to identify warm objects that may be presumed to be body parts. One a body part is detected, position and movements may be interpreted with gesture recognition hardware or software known to those of skill in the art, and my comparing the coordinates of the gesture with the underlying projected display, control inputs such as enlarging, reducing, scrolling, page turning, opening, closing, and so forth may be implemented, much like a touch screen.

Figure 7:
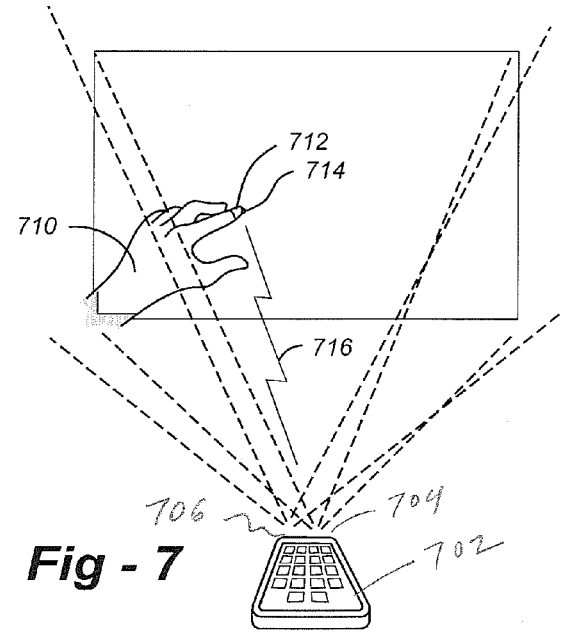
FIG. 7 illustrates how selection of a part of a projected image may be implemented with a fingertip device that generates a wireless signal when a surface is touched.

Selection presents a technical challenge, since the user is touching the projected image on a remote surface as opposed to a display screen. However, this problem may be solved if the user 710 wears a fingertip device 712 shown in FIG. 7. This device includes button at the tip of the finger which is activated when a surface is touched. Activation of the button causes the transmission of a wireless signal 716 received by the projector device 702. Using the location/movement detection capabilities discussed with reference to FIG. 6, the coordinates of the touched point may be determined and compared to the x-y coordinates of the projected images to facilitate a selection of the point, area, region or icon underlying the touched point. The wireless signal generated by the fingertip device may be an RF or acoustical signal or, alternatively, an infrared light may be generated which is picked up by the sensor 706.

The selection device need not be worn by a person and may alternatively be put on the end of a pointed used to tap the surface. As a further alternative, pressure-sensitive surfaces for the projected images, or touch-screen frames can provide information as to where a user may be touching the image. Various applications can benefit from such tactile or other feedback techniques enabling the various embodiments to function in an interactive environment. These kinds of signals can be used to trigger other events, such as advancing the slides in a presentation, or activating a link to another portion of a control program or a web site.

We claim:

1. Projected image correction apparatus, comprising:
    a device including a display processor and a projector operative to project an image defining a display area onto a surface;
    a sensor operative to view the projected image on the surface;
    a display buffer storing a raw image to be seen by a viewer;
    a projection buffer storing a version of the raw image to be projected onto the surface;
    a sensor buffer storing an image of the projected image as viewed by the sensor; and
    wherein the display processor is operative to compare the image stored in the sensor buffer to the image stored in the display buffer and adjust the image stored in the projection buffer so that the projected image seen by the sensor corresponds to the image stored in the display buffer;
    wherein the sensor is operative to view an area of the surface which is larger than the display area of the projected image and store an image of the larger area in the sensor buffer; and
    wherein, in comparing the image stored in the sensor buffer to the image stored in the display buffer, the display processor is operative to determine if the projected image has shifted and intentionally shift the image in the projection buffer to correct for defects in the projected image including motion artifacts caused by movement of the device.

2. The apparatus of claim 1, wherein:
    the device is a video projector; and
    the projector is operative to project a video image onto the surface.

3. The apparatus of claim 1, wherein the device is a portable computer.

4. The apparatus of claim 1, wherein the device is a smart phone.

5. The apparatus of claim 1, wherein the device is a camcorder.

6. The apparatus of claim 1, wherein the sensor is a two-dimensional image sensor.

7. The apparatus of claim 1, wherein the sensor is disposed in the device.

8. The apparatus of claim 1, wherein:
the sensor is disposed in a hand-held remote unit operative to control certain functions of the device; and
the hand-held remote unit communicates the information to the device through a wireless connection.

9. The apparatus of claim 1, wherein the correction occurs in conjunction with an initial projection.

10. The apparatus of claim 1, wherein the correction occurs in response to a user input.

11. The apparatus of claim 1, wherein the correction automatically occurs on an occasional or continuous basis.

12. The apparatus of claim 1, wherein the display generator is further operative to generate a test pattern to be viewed by the sensor for correction purposes.

13. The apparatus of claim 1, wherein the device includes a detachable or roll-out display screen providing the surface.

14. The apparatus of claim 1, further including:
a display screen providing the surface; and wherein:
the display screen includes corner or edge indicia to assist the sensor in determining the periphery thereof.

15. The apparatus of claim 1, wherein the display processor is operative to perform one or more of the following adjustments to the image stored in the projection buffer:
flipping,
stretching,
luminance or color curve adjustment,
color replacement,
pixel interpolation, and
rotation.

16. The apparatus of claim 1, further including:
gesture recognition apparatus operative to recognize a gesture made by a finger, hand or other body part overlying the projected image in the view of the sensor; and
control the device or projected image in response to the recognized gesture.

17. The apparatus of claim 1, wherein:
the projected image has x and y coordinates associated therewith; and
gesture recognition apparatus operative to determine the coordinates of a finger, hand or other body part overlying the projected image in the view of the sensor; and
apparatus operative to compare the position or movement thereof a finger, hand or other body part overlying the projected image to corresponding coordinates associated with the projected image to control the device or the projected image.

18. The apparatus of claim 1, wherein:
the projected image has x and y coordinates associated therewith;
the sensor includes an infrared imaging capability operative to detect a finger, hand or other body part overlying the projected image; and
gesture recognition apparatus operative to determine the coordinates of the finger, hand or other body part detected by the sensor; and
apparatus operative to compare the position or movement thereof a finger, hand or other body part overlying the projected image to corresponding coordinates associated with the projected image to control the device or the projected image.

19. The apparatus of claim 1, wherein:
the projected image has x and y coordinates associated therewith;
further including a tactile sensor operative to generate a wireless signal if a point of the surface is touched by a user;
a wireless receiver operative to receive the wireless signal; and
apparatus operative to receive the image viewed by the sensor, determine the coordinates of the point touched by the user in response to receipt of the wireless signal, and compare the coordinates to the coordinates of the projected image to select a region of the projected image associated with the point.

20. The apparatus of claim 19, wherein:
the wireless signal is an optical signal; and
the sensor is operative to detect the optical signal.

21. The apparatus of claim 19, wherein:
the wireless signal is an infrared signal; and
the sensor is operative to detect the infrared signal.

22. The apparatus of claim 19, wherein:
the wireless signal is an RF signal.

23. The apparatus of claim 1, wherein, in an event the display processor is unable to compensate for the motion, the projection buffer is selectively turned off or a frame rate is reduced to facilitate movement compensation.

* * * * *